(No Model.)　　　　　W. W. MARSH.　　　5 Sheets—Sheet 1.
CORN HARVESTER.
No. 596,073.　　　　　　Patented Dec. 28, 1897.
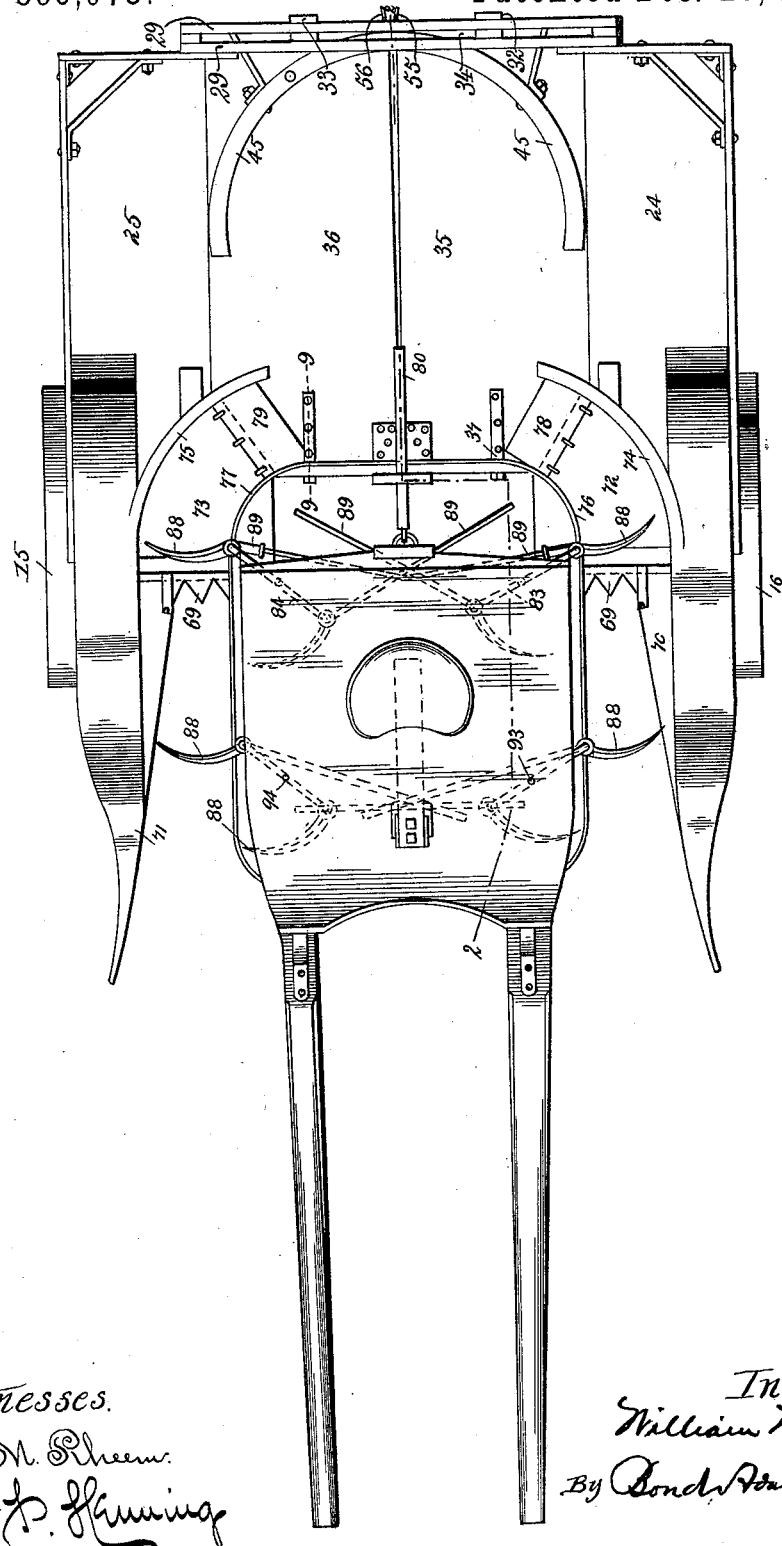
Witnesses.　　　　　　　　　　Inventor:
　　　　　　　　　　　　　　William W. Marsh
　　　　　　　　　　　　By Bond, Adams & Pickard
　　　　　　　　　　　　　　　Atty's.

(No Model.) 5 Sheets—Sheet 2.
W. W. MARSH.
CORN HARVESTER.
No. 596,073. Patented Dec. 28, 1897.
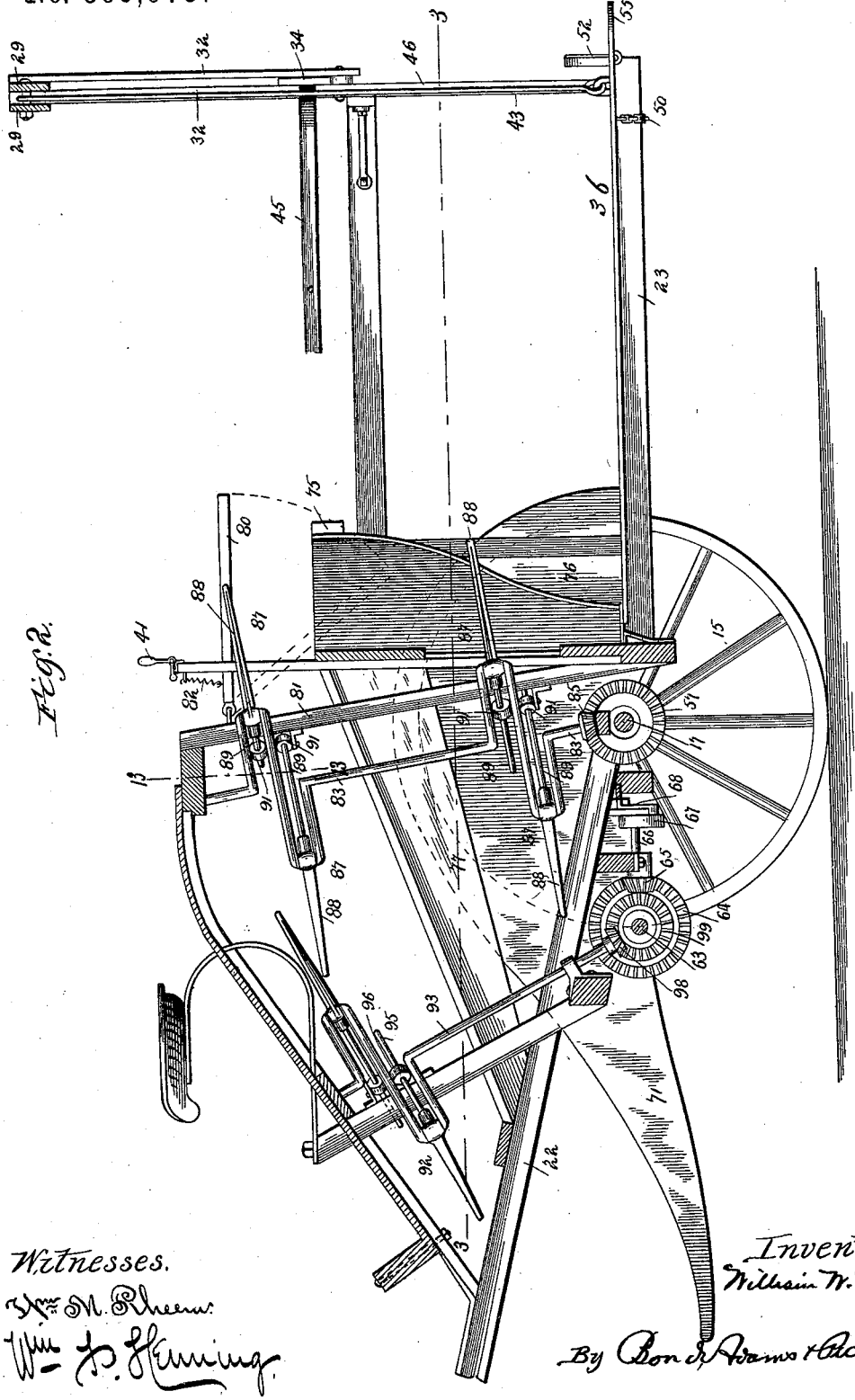

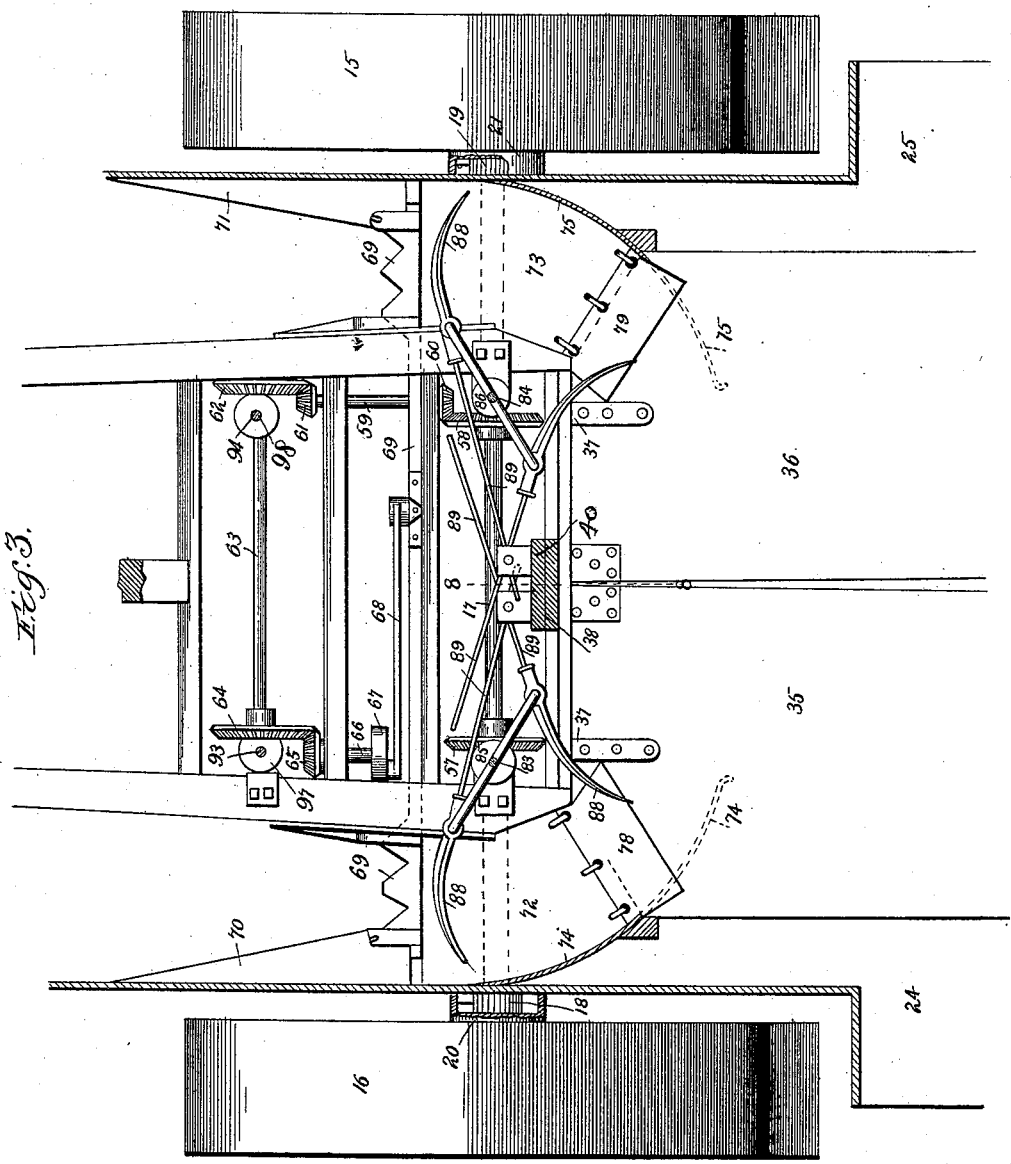

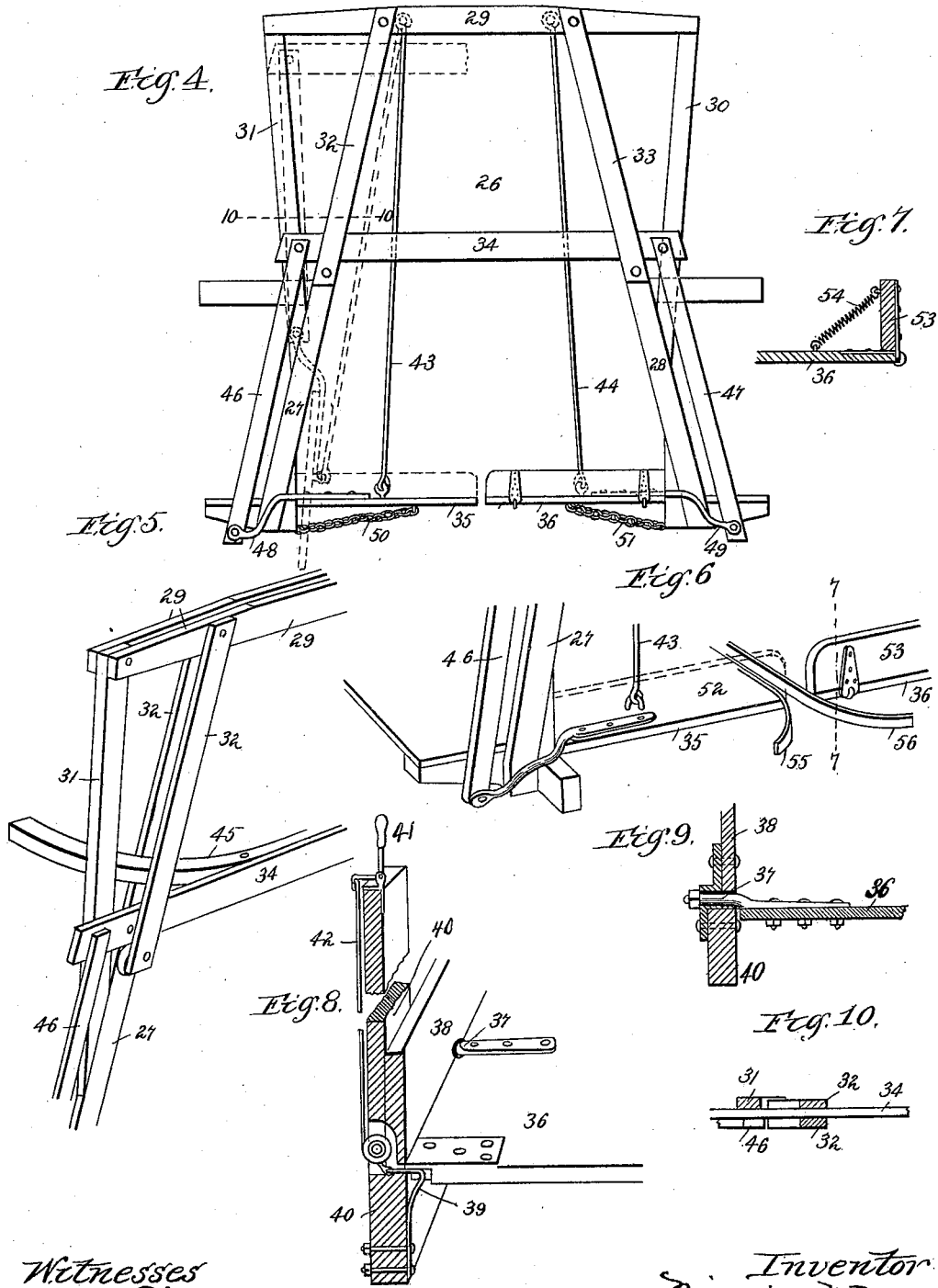

(No Model.) 5 Sheets—Sheet 5.
W. W. MARSH.
CORN HARVESTER.

No. 596,073. Patented Dec. 28, 1897.

Witnesses
Inventor:
William W. Marsh
By Bond, Adams & Pickard
Atty's

UNITED STATES PATENT OFFICE.

WILLIAM W. MARSH, OF LINCOLN, NEBRASKA.

CORN-HARVESTER.

SPECIFICATION forming part of Letters Patent No. 596,073, dated December 28, 1897.

Application filed July 12, 1892. Serial No. 439,844. (No model.)

*To all whom it may concern:*

Be it known that I, WILLIAM W. MARSH, a citizen of the United States, residing at Lincoln, in the county of Lancaster and State of Nebraska, have invented certain new and useful Improvements in Corn-Harvesters, of which the following is a specification, reference being had to the accompanying drawings, in which—

Figure 11:
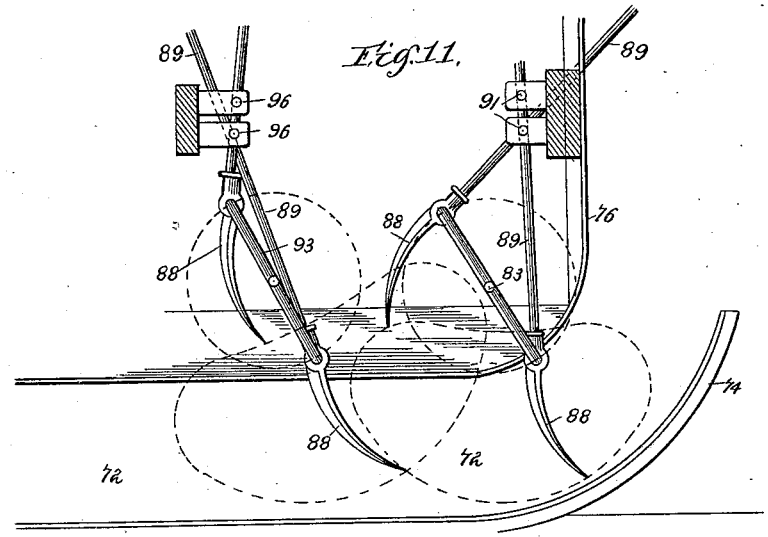
Figure 12:
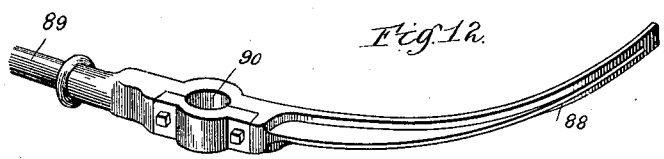
Figures 13, 14:
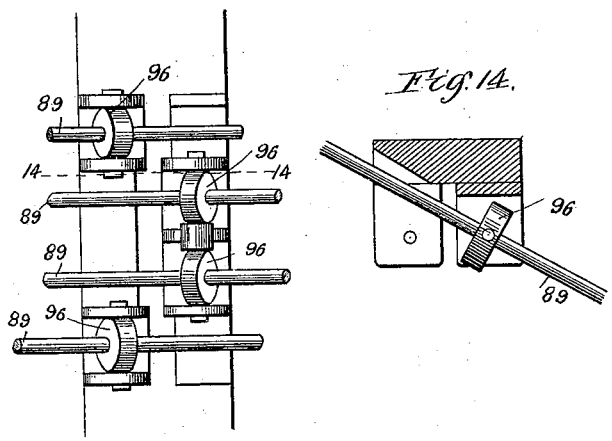

Figure 1 is a top or plan view. Fig. 2 is a longitudinal vertical section on line 2 2 of Fig. 1. Fig. 3 is a horizontal section on line 3 3 of Fig. 2. Fig. 4 is a rear view of the frame. Fig. 5 is a perspective view of one side of the upper portion of the rear frame. Fig. 6 is a perspective view of the lower portion of the rear of the frame. Fig. 7 is a section on line 7 7 of Fig. 6. Fig. 8 is a perspective view, being a vertical section on line 8 8 of Fig. 3. Fig. 9 is a detail, being a vertical section on line 9 9 of Fig. 1. Fig. 10 is a detail, being a section on line 10 10 of Fig. 4. Fig. 11 is an enlarged detail, being a top or plan view of a portion of one side of the machine, showing the operation of the front and rear gatherers. Fig. 12 is an enlarged detail, being a perspective view of one of the gatherers. Fig. 13 is an enlarged detail, being a view of the pivot-boxes, taken on line 13 13 of Fig. 2, looking to the front; and Fig. 14 is an enlarged detail, being a horizontal section on line 14 14 of Fig. 13.

My invention relates to corn-harvesters; and the objects of my invention are to provide a new and improved harvester in which the corn may be shocked while the machine is in motion and may be readily deposited upon the ground after the shock has been formed; to a provide new and improved means for picking up inclined stalks and delivering the cut stalks to the operator; to provide new and improved means for cutting the stalks; to provide new and improved mechanism for delivering the corn shocks upon the ground, and to otherwise improve the construction and operation of corn-harvesters. I accomplish these objects as hereinafter specified and as illustrated in the drawings.

That which I regard as new will be pointed out in the claims.

In the drawings, 15 16 indicate driving-wheels which are mounted upon a horizontal shaft 17. The driving-wheels 15 and 16 rotate the shaft 17 by means of ratchets 18 and 19, which are protected by boxes 20 21, as best shown in Fig. 3.

22 indicates thills which are suitably secured to the shaft 17 or other part of the frame of the machine.

23 indicates horizontal bars which are supported from the shaft 17 and extend rearward at opposite sides of the machine.

24 25 indicate stationary platforms which are mounted upon bars 23 and extend rearward back of the wheels 15 and 16. The stationary platforms 24 and 25 are intended for the use of the operators who operate the machine.

26 indicates the rear frame of the machine, which consists of upwardly-extending bars 27 28, united at their upper ends by cross-bars 29, as best shown in Fig. 4.

30 31 indicate braces which at their lower ends are connected to the bars 27 and 28 and at their upper ends to the cross-bars 29, as also shown in Fig. 4.

32 33 indicate guide-strips which are supported by the bars 27 and 28 and the cross-bars 29, as best shown in Fig. 5, so as to provide a space between each pair of bars 32 and 33, as will be understood by reference to Fig. 5. A cross-bar 34 has its ends arranged in the spaces between the pairs of bars 32 and 33, whereby the cross-bar 34 is capable of rising and falling, and in such movements is guided by the bars 32 and 33. The ends of the bar 34 project beyond the bars 27 and 28, as shown in Fig. 4. The bar 34 carries a curved shock-support 45, which serves to prevent the shock which is being formed from sliding off the platform, as will be hereinafter described.

35 36 indicate two movable platforms which are arranged in a horizontal position between the stationary platforms 24 and 25 and on a level with such stationary platforms. The forward end of each movable platform 35 and 36 is provided with a pin 37, which projects forward and is loosely journaled in a suitable standard or support 38. The pins 37 are located about the middle of the platforms 35 and 36, so that when the platforms are turned upon the pins 37 into a vertical position there will be left between them a space about equal to the width of one of the platforms. The inner forward edge of each of the movable platforms 35 and 36 is supported by a spring-stop 39, which is mounted upon a standard 40, as best shown in Fig. 8. The stop 39 is adapted to be withdrawn from engagement with the platforms 35 and 36 by means of a lever 41, which is connected to said stop by a connecting-rod 42, as best shown in Fig. 8. When the stop 39 is withdrawn, the forward ends of the platforms 35 and 36 will be free to swing upon the pins 37, the object of which construction will be hereinafter set forth. The rear ends of the platforms 35 and 36 are supported by rods 43 44, which depend from the cross-bars 29, and are hinged to the platforms 35 and 36 on about their central lines, as shown in Fig. 4. By this construction the tilting of the platforms is freely permitted, and the rear ends of the platforms may be swung laterally, the object of which construction will be hereinafter set forth.

46 47 indicate connecting-rods which at their upper ends are connected to the ends of the cross-bar 34, and at their lower ends are connected by bent levers 48 and 49, respectively, which are connected, respectively, to the rear ends of the platforms 35 and 36. By this construction when the platforms 35 and 36 are swung outward and tilted the cross-bar 34 and shock-support 45 will be lifted, as indicated by dotted lines in Fig. 4.

50 51 indicate chains which are connected to the platforms 35 and 36 and to adjacent portions of the stationary platforms and serve to prevent the said movable platforms from moving too far out of position.

52 53 indicate end-gates which are hinged at the ends of the tilting platforms 35 and 36, and are held in a vertical position by springs 54, as shown in Fig. 7. The gates 52 53 serve to prevent the shock from slipping off the platforms when the harvester is moving over hilly ground.

55 56 indicate curved arms which project rearward from the inner edges of the platforms 35 and 36 and engage the shock which has been deposited upon the ground after the harvester begins to move away from it, and thereby prevent the platforms swinging inward too suddenly, so that the harvester is permitted to clear the shock.

The weight of the cross-bar 34 and bars 46 and 47 is sufficient to cause the platforms 35 and 36 to return to their horizontal position after the shock has been deposited upon them.

The following apparatus is provided for cutting the corn and delivering the stalks from the platforms 35 and 36.

57 58 indicate beveled gears which are mounted at opposite sides of the machine upon the shaft 17, as best shown in Fig. 3.

59 indicates a shaft which is mounted in the frame of the machine and extends longitudinally thereof, as shown in Fig. 3. The shaft 59 carries at its rear end a beveled gear 60, which intermeshes with a gear 58, and at its forward end a gear 61, which intermeshes with a gear 62, mounted upon a transverse shaft 63, as also shown in Fig. 3. The shaft 63 is journaled in suitable bearings in the frame of the machine and carries a second beveled gear 64, as shown in Fig. 3. The gear 64 meshes with a gear 65, which is mounted upon a shaft 66, which extends longitudinally of the machine, as shown in Fig. 3. Upon the rear end of the shaft 66 is mounted a crank-wheel 67, which is connected by a pitman 68 to a sickle 69. The cutting-sections of the sickle 69 are at each side of the machine, as shown in Fig. 3. By this construction the sickle is reciprocated from the main shaft.

70 71 indicate dividers which have inclined inner surfaces and extend forward at each side of the machine. The dividers serve to direct the standing corn to the sickle.

72 73 indicate curved platforms which are placed immediately back of the cutting-sections of the sickle 69, at each side of the machine, as best shown in Fig. 3, and are adapted to receive the cut stalks from the sickle and support them as they are moved back to the tilting platforms 35 and 36.

74 75 indicate outer curved guides which are arranged vertically along the edges of the platforms 72 and 73 and serve to support the cut stalks.

76 77 indicate inner curved guides which also serve to support the stalks. By this construction narrow passages are formed through which the cut stalks pass on their way to the platforms 35 and 36.

78 79 indicate small hinged extensions of the platforms 72 and 73, respectively, which extensions lie over the forward outer edges of the platforms 35 and 36, and when such platforms 35 and 36 are tilted as hereinbefore described the arrangement is such that the extensions 78 and 79 will be turned upward to a vertical position to prevent the stalks from being delivered from the platforms 72 and 73 while the tilting platforms 35 and 36 are out of their horizontal position.

80 indicates a central supporting-bar which is hinged upon a standard 81, and projects rearward therefrom a short distance above the guides 74 and 75. The bar 80 is adapted to be swung in a vertical plane, as indicated by dotted lines in Fig. 2, and is held in a substantially horizontal position by a spring 82.

83 84 indicate two crank-shafts which are mounted in an inclined position at opposite sides of the machine a short distance in front of the forward ends of the platforms 35 and 36, as shown in Fig. 3. The shafts 83 and 84 are suitably journaled at their upper ends in the frame of the machine, and their lower ends are provided with beveled gears 85 and 86, respectively, which intermesh, respectively, with the gears 57 and 58, as shown in Figs. 2 and 3. By this construction the crank-shafts will be rotated by the rotation of the main axle 17. Each shaft 83 and 84 carries two pairs of gatherers 87, two near its lower end and two near its upper end, as shown in Fig. 2. Each gatherer consists of a curved arm 88 and a stem 89, which projects rearward from the arm 88. The base of the arm 88 of each gatherer is provided with a bearing 90, by means of which it may be mounted upon the crank-shaft. The stem 89 of each gatherer is fitted into a suitable bearing in a pivot-box 91, which is mounted in a vertical position in the frame of the machine, as best shown in Fig. 2. The pivot-boxes 91 are pivoted to permit of the rotation of the crank-shaft. As shown in Fig. 13, the pivot-boxes of the gatherers, carried by the shafts 83 and 84, are placed adjacent to each other. By this construction as the crank-shafts are rotated the arms 88 of the gatherers, carried by such crank-shafts, will move in the manner indicated by the dotted lines in Fig. 11, the gatherers on the opposite side of the machine moving in opposite directions. The gatherers are so placed that they will engage the stalks and move them toward the delivery ends of the platforms 72 and 73, and at the proper instant the gatherers are withdrawn from behind the stalks, so that the latter are not actually thrown over upon the platforms 35 and 36.

In order to raise inclined stalks and present them properly to the sickle, I provide a second set of gatherers 92, which are mounted upon crank-shafts 93 and 94, mounted in the frame of the machine at a point forward of the sickle, as best shown in Fig. 3. The crank-shafts 93 and 94 are inclined somewhat more than the shafts 83 and 84 to better adapt the gatherers 92 to lifting up inclined stalks. The gatherers 92 are similar to the gatherers 87, being provided with stems 95, which fit into pivot-boxes 96. The crank-shaft 93 is driven by means of a beveled gear 97, operated from the gear 64, and the shaft 94 carries on its lower end a gear 98, which is operated by a gear 99, carried by the gear 62, as best shown in Fig. 2. The gatherers 92 are so placed as to coöperate with the gatherers 87, to which they deliver the stalks. The speed of the forward gatherers is so timed and regulated that by their horizontal movement they will press gently against the standing corn, while by their inclined upward movement they will raise and straighten up the leaning corn. The pivot-boxes of the forward and rear gatherers are so placed in relation to the crank-shafts upon which the gatherers are mounted and the shape of the arms of the gatherers is such that they will be withdrawn from the corn without pulling it back with them. The operation of the front and rear gatherers in relation to each other is shown in Fig. 11, the path of the gatherers being indicated by dotted lines. The speed of the gatherers is regulated so that they will move the corn at about the same rate as a team will walk, or nearly so, so that in case the gatherers come against standing corn they will only press it back gently.

The operation of the harvester is as follows: As the machine is drawn forward the front gatherers 92 raise the leaning stalks and press them with the standing stalks gently back until they are taken by the rear gatherers 87, which press them back against the sickle, when they are cut, and then around through each passage to the supporting-bar 80. The supporting-bar supports both rows as cut and delivered, or one row where the other may be deficient. The operators then take the stalks and arrange the shock on the movable platforms 35 and 36, and when enough stalks for a shock have thus been cut and gathered the machine is stopped and the shock is bound in the usual manner. The tilting platforms 35 and 36 are then tilted by operating the lever 41, and the shock is permitted to drop through between such platforms upon the ground. The machine is then started and moves away from the shock, the cross-bar 34 and shock-supporting bar 45 being then raised to the position shown by dotted lines in Fig. 4 to permit the shock to pass under such bars. The curved extensions 55 and 56 will prevent the platforms from returning to their horizontal position until the shock has been cleared, after which the weight of the cross-bars 34 and 45 and other parts will cause the tilting platforms 35 and 36 to return to their horizontal position. As soon as the machine starts it will begin to gather the stalks again; but, as above described, the hinged gates 78 and 79 will be turned to a vertical position by the tilting of the platforms 35 and 36, and the stalks will thereby be held in the passages until the tilting platforms return to their horizontal position.

It will of course be understood that the arms 88 in practice pass above the gates 78 and 79 when the latter are raised.

That which I claim as new, and desire to secure by Letters Patent, is—

1. In a corn-harvester, the combination with a carriage and stationary platforms carried thereby, of tilting platforms carried between said stationary platforms, each of said tilting platforms being loosely pivoted at its forward end at approximately its longitudinal center in such manner as to permit said platforms to tilt and swing laterally, and swinging devices from which the rear ends of the tilting platforms are freely suspended, whereby the rear ends of said swinging platforms when tilted are caused to move in opposite directions in a substantially horizontal plane, substantially as described.

2. In a corn-harvester, the combination with a carriage, and stationary platforms carried thereby, of tilting platforms 35 and 36 arranged between the stationary platforms, each of said platforms being pivoted at its forward end so that it is adapted to swing laterally at its rear, pivotally-suspended rods 43 and 44 supporting the rear ends of the tilting platforms and permitting the same to swing laterally in opposite directions, and a movable stop for supporting the forward inner edges of the tilting platforms to hold them in a horizontal position, substantially as described.

3. In a corn-harvester, the combination with a carriage, and stationary platforms carried thereby, of tilting platforms 35 and 36 between said stationary platforms, each of said platforms being pivoted at its forward end, rods 43 and 44 freely suspended at their upper ends from a frame for supporting said rods, and loosely connected at their lower ends to the rear ends of the tilting platforms, and a movable stop for supporting the forward inner edges of said platforms 35 and 36 to hold them in a horizontal position, substantially as described.

4. In a corn-harvester, the combination with a carriage, stationary platforms carried thereby, and tilting platforms pivoted at their forward ends and freely suspended at their rear ends between said stationary platforms, the rear ends of said platforms being adapted to swing outward when the platforms are tilted, of a shock-supporting bar, guides adapted to cause said shock-supporting bar to move in a vertical plane, and levers connecting said bar with said tilting platforms, whereby by the swinging of the rear ends of said platforms said shock-supporting bar will be moved in a vertical plane, substantially as described.

5. In a corn-harvester, the combination with a carriage, stationary platforms carried thereby, and tilting platforms arranged between the stationary platforms and having their rear ends adapted to swing laterally in opposite directions when said platforms are tilted, of a vertically-movable shock-supporting bar, guides for causing the shock-supporting bar to move in a vertical plane, and levers connecting the shock-supporting bar with the tilting platforms, whereby the shock-supporting bar is elevated by the movement of the tilting platforms, substantially as described.

6. In a corn-harvester, the combination with a carriage, stationary platforms carried thereby, tilting platforms 35 and 36 between said stationary platforms, and rods 43 and 44 supporting the rear ends of said platforms 35 and 36, of cross-bar 34, guides for said cross-bar, connecting-rods 46 and 47, and levers 48 and 49 connecting said rods 46 and 47 respectively with the platforms 35 and 36 respectively, whereby by the swinging of said tilting platforms said cross-bar will be moved in a vertical plane, substantially as described.

7. In a corn-harvester, the combination with a carriage, stationary platforms carried thereby, and tilting platforms between said stationary platforms, of rearward extensions 55 and 56 adapted to engage the shock as the machine moves away from it, substantially as and for the purpose specified.

8. In a corn-harvester, the combination with a carriage, rear platforms adapted to receive cut stalks, a sickle 69, and curved platforms 72 and 73, of devices for carrying the stalks along said platforms 72 and 73 to the rear platforms, a supporting-bar 80 hinged centrally at the forward end of said rear platforms, and a spring 82 adapted to normally hold said bar in a horizontal position, substantially as described.

WILLIAM W. MARSH.

Witnesses:
HOWARD ADAMS,
HOWELL JORDAN.